United States Patent
Franceschetti

(10) Patent No.: US 11,032,131 B1
(45) Date of Patent: Jun. 8, 2021

(54) METHODS AND SYSTEMS FOR COMMUNICATION WITH AIR GAPPED COMPUTER SYSTEMS

(71) Applicant: Roberto Franceschetti, Longwood, FL (US)

(72) Inventor: Roberto Franceschetti, Longwood, FL (US)

( * ) Notice: Subject to any disclaimer, the term of this patent is extended or adjusted under 35 U.S.C. 154(b) by 0 days.

(21) Appl. No.: 15/929,873

(22) Filed: May 27, 2020

(51) Int. Cl.
*H04L 29/08* (2006.01)
*H04L 12/24* (2006.01)
*G06K 19/06* (2006.01)
*G06F 21/60* (2013.01)

(52) U.S. Cl.
CPC ...... *H04L 41/069* (2013.01); *G06K 19/06037* (2013.01); *H04L 67/02* (2013.01); *G06F 21/602* (2013.01)

(58) Field of Classification Search
CPC ......... H04L 67/02; H04L 67/28; H04L 63/20; H04L 63/1408; H04L 63/1433; G06K 19/06037; G06K 19/06056; G06K 19/06103; G06K 7/1417; G06F 21/577; G06F 11/0793; H04W 12/08
See application file for complete search history.

(56) References Cited

U.S. PATENT DOCUMENTS

| | | | |
|---|---|---|---|
| 10,033,797 B1* | 7/2018 | Alger | H04L 67/02 |
| 2014/0153044 A1* | 6/2014 | Kubo | G06F 3/1288 358/1.15 |
| 2014/0208420 A1* | 7/2014 | Mraz | H04L 63/1408 726/22 |
| 2016/0308680 A1* | 10/2016 | Lindteigen | H04L 9/0861 |
| 2018/0351780 A1* | 12/2018 | Atanasov | H04L 67/10 |
| 2019/0052638 A1* | 2/2019 | Agarwal | G07C 3/00 |

OTHER PUBLICATIONS

Praveen Kurni (SCADA Integration with SAP using SAP PI, Jun. 9, 2011, SAP Blog).*

* cited by examiner

*Primary Examiner* — Chirag R Patel
(74) *Attorney, Agent, or Firm* — Ascenda Law Group, PC

(57) ABSTRACT

Methods and systems in which data formatted according to an air-gapped network protocol is converted to machine-readable optical labels for communication across the air gap. Communication between computer systems across an air gap is facilitated by converting data to one or more machine-readable optical labels and displaying those labels on a first display device coupled to a computer system within an air-gapped network. At another computer system outside the air gapped network, an imaging device receives the machine-readable optical labels displayed on the first display device. The information encoded in the machine-readable optical labels is decoded to recover the original data from the air gapped network and provided to one or more nodes of the non-air-gapped computer network.

6 Claims, 3 Drawing Sheets

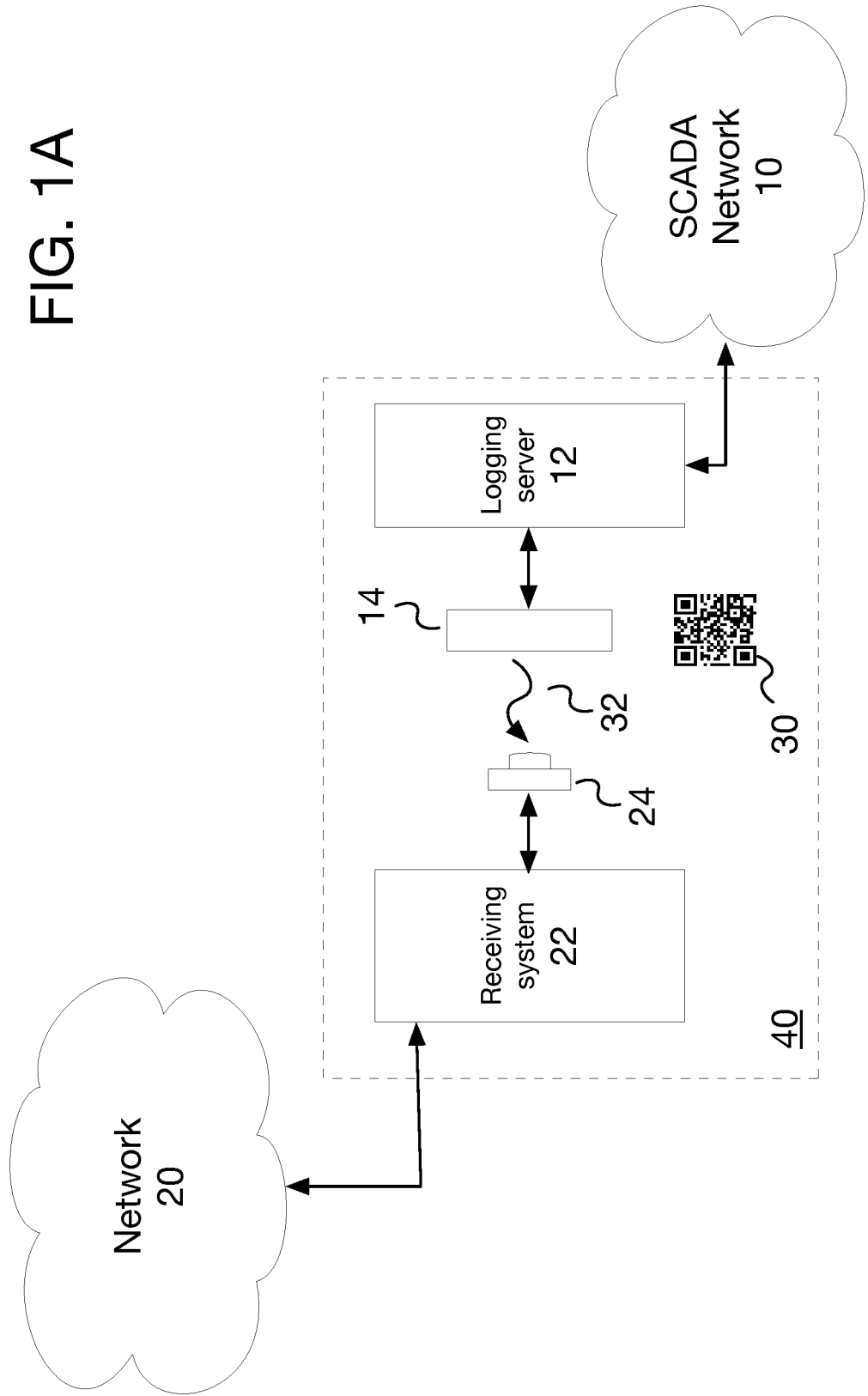

METHODS AND SYSTEMS FOR COMMUNICATION WITH AIR GAPPED COMPUTER SYSTEMS

RELATED APPLICATIONS

This is a NONPROVISIONAL of, claims priority to, and incorporates by reference U.S. Provisional Application No. 62/865,441, filed Jun. 24, 2019.

FIELD OF THE INVENTION

The present invention relates to methods and systems for communication with air gapped computer systems, and, more particularly, for such method and systems in which data formatted according to an air-gapped network protocol is converted to machine-readable optical labels for communication across the air gap.

BACKGROUND

Information and network security is critical in many computer networks that include nodes controlling and monitoring important infrastructure equipment. These so-called supervisory control and data acquisition (SCADA) networks allow organizations to monitor and control industrial equipment and processes, for example through interaction with individual pumps, valves, sensors, motors, generators, and other devices. Events associated with such equipment are typically recorded into log files at a logging server.

Within the SCADA network, the log information is typically communicated from programmable logic controllers (PLUs) and/or remote terminal units (RTUs) associated with the equipment being monitored and/or controlled to one or more logging servers using syslog messages. Syslog messages from multiple nodes in the SCADA network are consolidated at the syslog server(s) using a listener service that recognizes messages sent of a well-known port. Most often syslog messages are sent using a user datagram protocol (UDP) over port 514. The messages typically include basic information concerning the source of the information being included and timestamps in addition to the actual log messages (which are often, though not necessarily, transmitted in a human-readable format).

Because the infrastructure under the control and management of the SCADA network components is often mission critical in nature, these networks are typically not connected to unsecured networks, such as the Internet, which may provide attack vectors for malicious actors and agents. While such protections are necessary to guard against the possibility of computer hackers, software viruses, trojans, etc., it presents difficulty inasmuch as the log information collected by the logging servers cannot easily be extracted for review and analysis. In many cases, operators are forced to review the information at dedicated consoles communicably connected only to the logging servers within secure environments. If the log data is to be reviewed elsewhere, it must either be retrieved in hard copy form and reproduced manually in noes of an external computer network or copied onto portable media for such a transfer. Manual transfer is tedious and prone to error in the replication of the information and the use of portable media invites compromise of the SCADA network and so is prohibited in many instances.

SUMMARY OF THE INVENTION

In one embodiment of the invention, a first computer system of a first computer network is communicatively coupled to a second computer system of a second computer network across an air gap. The first computer network is made up of a plurality of nodes, each communicatively coupled to only other nodes of the first computer network. The first computer system receives SYSLOG data from one or more of the nodes of the first computer network and, line by line, converts the SYSLOG data to one or more machine-readable optical labels which are displayed on a first display device coupled to the first computer system. The second computer system is communicatively coupled to a second computer network and receives, via an imaging device coupled to the second computer system, the machine-readable optical labels displayed on the first display device. The second computer system converts the machine-readable optical labels to reconstituted SYSLOG data and provides the reconstituted SYSLOG data to one or more nodes of the second computer network.

In a further embodiment of the invention, a first computer system of a first computer network converts a hypertext transfer protocol (HTTP) request issued by an application executing on the first computer system to one or more first machine-readable optical labels and displays said first machine-readable optical labels on a first display device coupled to the first computer system. A second computer system of a second computer network made up of a plurality of nodes, each communicatively coupled to only other nodes of the second computer network, receives, via an imaging device coupled to the second computer system, the first machine-readable optical labels displayed on the first display device. The second computer system decodes the first machine-readable optical labels to recover the request, retrieves data responsive to said request from a hypertext markup language (HTML) source stored in a node of the second computer network, encodes the data from the HTML source in one or more second machine-readable optical labels, and displays said second machine-readable optical labels on a second display device coupled to the second computer system. The first computer system subsequently receives, via an imaging device coupled to the first computer system, the second machine-readable optical labels displayed on the second display device, decodes the second machine-readable optical labels to recover the data from the HTML source, and provides the recovered data to one or more nodes of the first computer network.

These and further embodiments of the invention are discussed in detail below.

BRIEF DESCRIPTION OF THE DRAWINGS

The present invention is illustrated by way of example, and not limitation, in the figures of the accompanying drawings, in which:

FIG. 1A illustrates an air gapped network configured in accordance with one embodiment of the present invention.

DESCRIPTION

Figure 1B:
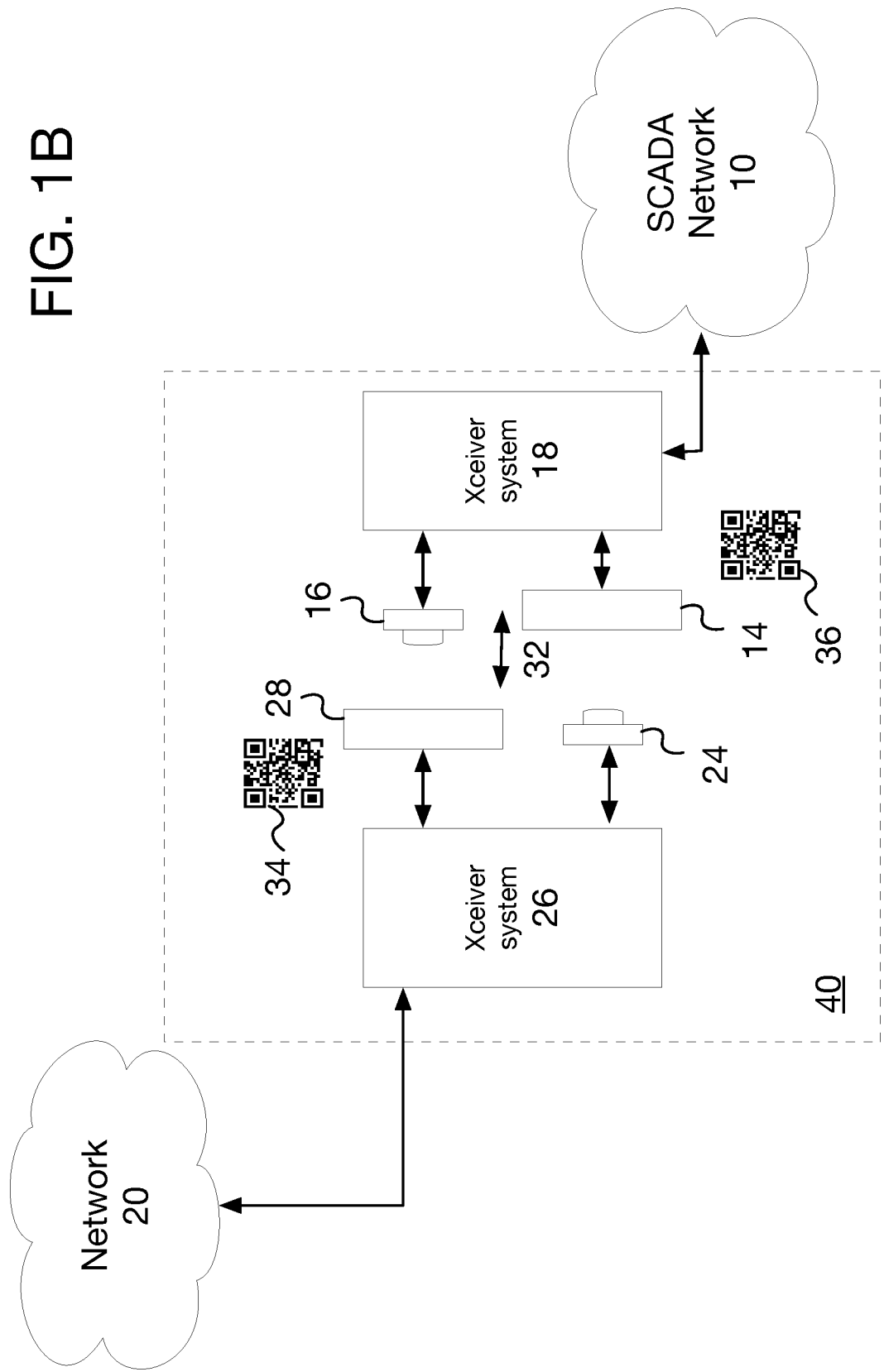
FIG. 1B illustrates two-way communication across air gap between SCADA network and computer network in accordance with one embodiment of the present invention.

Described herein are methods and systems for communication with air gapped computer systems, particularly method and systems in which data formatted according to an air-gapped network protocol is converted to machine-readable optical labels for communication across the air gap. The SCADA networks described above are one example of so-called air gapped computer networks. More generally, such networks and workstations are physically and communicatively separated from other, unsecured computer equipment and networks as a means of enforcing a level of safety over the possible compromise of the networks and workstations through software viruses and other malicious agents. An air gapped computer or network is one that has no interfaces, wired or wireless, connected to an outside network.

In embodiments of the present invention, communication between computer systems or networks across an air gap is facilitated by converting data within the air-gapped network to one or more machine-readable optical labels and displaying those labels on a first display device coupled to a computer system within the air-gapped network. At another computer system outside the air gapped network, an imaging device receives the machine-readable optical labels displayed on the first display device. The information encoded in the machine-readable optical labels is decoded to recover the original data from the air gapped network and provided to one or more nodes of the non-air-gapped computer network. For example, in the case where the information to be extracted from the air-gapped network is syslog data, e.g., from a syslog logging server that is associated with the air-gapped network, the syslog data from the logging server is converted, e.g., line by line, to one or more machine-readable optical labels and those labels are displayed on a display device coupled to syslog server or another computer system which extracts the data from the syslog server. At a second computer system that is not part of the air-gapped network, an imaging device receives the machine-readable optical labels displayed on the display device, converts those machine-readable optical labels to reconstitute the original syslog data. The reconstituted syslog data may be displayed to an operator at the second computer system, stored locally or remotely, and/or provided to one or more nodes of a second computer network of which the second computer system is a part. Because the information flow is one-way across the air gap, there is no threat of malicious software of instructions being transmitted into the air-gapped network. Further, because the communication is optical in nature, it can be performed in a secure environment such as a restricted access room in order to minimize the possibility of interception. Finally, because the information being transferred is encoded in machine-readable optical labels and optionally encrypted before such encoding, the risk of compromise due to observation by unauthorized persons is minimized.

Further embodiments of the invention provide for two-way communication across an air gap between computer networks. For example, a first computer system of a first computer network may request information from a computer resource of an air gapped computer network by issuing a request for same. In one example, the request may be a hypertext transfer protocol (HTTP) request issued by an application (e.g., a web browser) executing on the first computer system. The HTTP or other request is converted to one or more machine-readable optical labels that are displayed on a display device coupled to the first computer system. The displayed machine-readable optical labels that encode the request are received a second computer system of the air-gapped computer network, e.g., via an imaging device such as a camera. Those labels are decoded (and, if necessary, decrypted) to recover the request. The request is interpreted and data responsive to the request is retrieved. For example, in the case where the request is an HTTP GET, the responsive data may be retrieved from a hypertext markup language (HTML) source (such as a web page) stored in a node of the second computer network. The retrieved data is encoded in one or more machine-readable optical labels. Optionally, the retrieved data may first be encrypted before it is so encoded. The encoded data responsive to the request is displayed as the machine-readable optical labels on a display device coupled to the second computer system. Those machine-readable optical labels encoding the retrieved data are received at the first computer system via an imaging device coupled thereto, decoded, and if necessary decrypted, to recover the data from the data source in the second network. The recovered data may then be displayed to an operator at the first computer system, stored locally or remotely, and/or provided to one or more nodes of the non-air-gapped computer network of which the first computer system is a part. In this example the information flow across the air gap is two-way, however, because the communication is optical and short-range in nature it can be performed in a secure environment, such as a restricted access room, in order to minimize the possibility of interception or the injection of malicious code. As before, because the information being transferred is encoded in machine-readable optical labels and optionally encrypted before such encoding, the risk of compromise due to observation by unauthorized persons is minimized.

FIGS. 1A and 1B illustrate examples of networks within which embodiments of the invention may be instantiated. In FIG. 1A, an air gapped network, e.g., a SCADA network, 10 includes a logging server 12. In some cases, the logging server is a separate computer and element 12 is a system that extracts log information stored by the logging computer. Logging server 12 receives and, optionally stores, either locally or in an accessible database (not shown), log information produced by nodes of the SCADA network 10. The log information is transmitted within the SCADA network 10 as syslog messages using a UDP protocol. Logging server 12 is configured to parse the UDP packets and extract the payload of the syslog message. Often this will be text data, but if not the logging server 12 is configured to convert the extracted payload information to text data. The text data is stored by the logging server 12.

Network 20 is a computer network separated from the SACADA network 10 both physically and electronically, other than via the optical communications discussed below. Components of the SACADA network 10 are communicatively coupled only to other components thereof (except for the optical communications described below), however, components of network 20 may be communicatively coupled to nodes of network 20 and other networks, e.g., the Internet, as well. One component of network 20 is a receiving computer system 22.

In order to provide the log information from logging server 12 outside of the SCADA network 10, communication across an air gap 32 is facilitated by the logging server 12 converting the text data extracted from the syslog UDP packets to one or more machine-readable optical labels 30 and displaying those labels on a display device 14 coupled to the logging server 12. At receiving system 22, an imaging device 24, e.g., a camera, coupled to the receiving system 22 receives images of the machine-readable optical labels 30 displayed on display device 14. The information encoded in the machine-readable optical labels 30 is decoded by receiving system 22 to recover the original syslog data from the SCADA network and may be stored locally at the receiving system or in a database communicatively coupled thereto, displayed to a user of the receiving system, and/or provided to one or more other nodes of computer network 20. Because the information flow is one-way across the air gap 32, there is no threat of malicious software of instructions being transmitted into the SCADA network. Further, because the communication is optical in nature, it can be performed in a secure environment such as a restricted access area 40 in order to minimize the possibility of interception. Finally, because the information being transferred is encoded in machine-readable optical labels 30 and optionally may be encrypted by logging server 12 before such encoding, the risk of compromise due to observation by unauthorized persons is minimized.

Many different kinds of machine-readable optical labels 30 may be used in embodiments of the present invention. For example, linear or one-dimensional bar codes such as Codebar, Code 25, Code 11, Code 32, Code 39, Code 49, Code 93, Code 128, EAN 2, EAN 5, EAN 8, EAN 13, GS1-128, GS1 DataBar, ITF-14, JAN, MSI, USPS Planet and/or POSTNET, PostBar, Plessey, RM4SCC, RM Mailmark, Telepen, and/or UPC codes may be used. Alternatively, or in addition, matrix or two-dimensional bar codes such as AR Code, Aztec Code, BEEtag, Bokode, Code 1, Code 16K, ColorCode, Color Construct Code, CRONTO, CyberCode, d-touch, DataGlyphs, Data Matrix, Datstrip Code, Digimark Code, DotCode, DWCode, EXCode, Han Xin barcode, high capacity color barcode, HueCode, InterCode, JAB-Code, MaxiCode, mCode, MMCC, NexCode, PDF417, Qcode, QR code, screen code, ShotCode, Snapcode, Snowflake Code, SPARQCode, Trillcode, and/or VOICEYE codes may be used.

Referring now to FIG. 1B, in this example two-way communication across air gap 32 between SCADA network 10 and computer network 20 is facilitated. For example, a transceiver system 26 of computer network 20 may request information from a computer resource of SCADA network 10 by issuing a request for same. In one example, the request may be an HTTP request issued by an application (e.g., a web browser) executing on the transceiver system 26. The HTTP or other request is converted to one or more machine-readable optical labels 34 that are displayed on a display device 28 coupled to the transceiver system 26. The displayed machine-readable optical labels 34 that encode the request are received a transceiver system 18 of the SCADA or other air-gapped computer network 10 via an imaging device 16 such as a camera. Those labels are decoded (and, if necessary, decrypted) to recover the request.

The request is interpreted by the transceiver system 18 and data responsive to the request is retrieved. For example, in the case where the request is an HTTP GET, the responsive data may be retrieved from an HTML source (such as a web page) stored in a node of the SCADA network 10. This may be the transceiver system 18 itself or another resource. The retrieved data is encoded by transceiver system 18 into one or more machine-readable optical labels 36. Optionally, the retrieved data may first be encrypted before it is so encoded.

The encoded data responsive to the request is displayed as the machine-readable optical labels 36 on display device 14 coupled to the transceiver system 18. Images of those machine-readable optical labels 36 encoding the retrieved data are received at transceiver system 26 of network 20 via an imaging device 24 coupled thereto, decoded, and if necessary decrypted, to recover the data from the data source in the SCADA network 10. The recovered data may then be displayed to an operator at transceiver system 26, stored locally or remotely, and/or provided to one or more nodes of computer network 20.

In this example the information flow across the air gap 32 is bi-directional, however, because the communication is optical and short-range in nature it can be performed in a secure environment, such as a restricted access room 40, in order to minimize the possibility of interception or the injection of malicious code. As before, because the information being transferred is encoded in machine-readable optical labels and optionally encrypted before such encoding, the risk of compromise due to observation by unauthorized persons is minimized.

Figure 2:
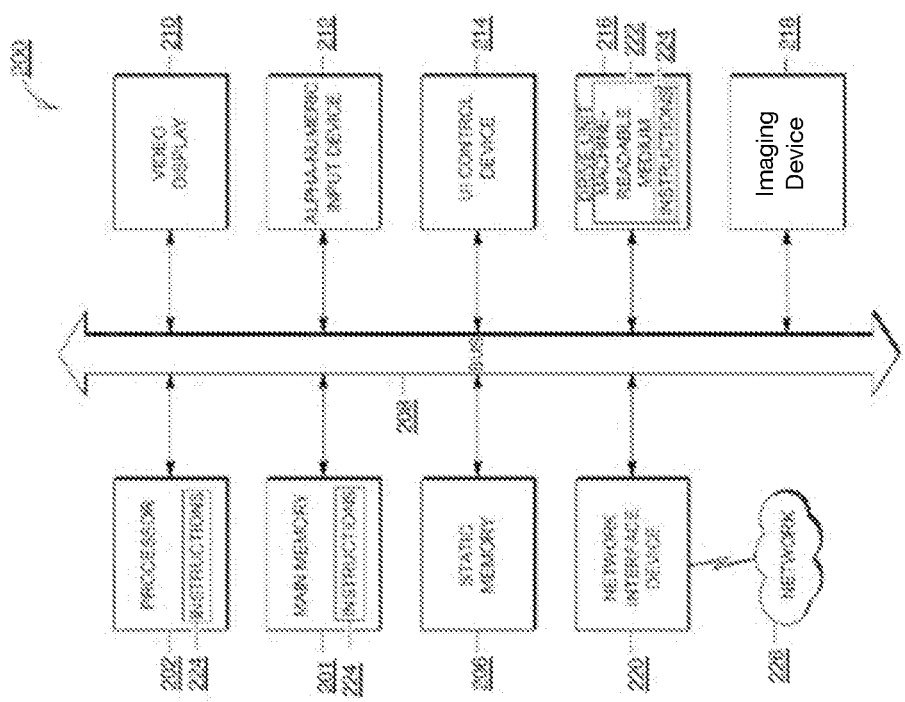
FIG. 2 is a block diagram of an exemplary computer system upon which embodiments of the present invention may be implemented.

In the present invention, the operations referred to are machine operations. Useful machines for performing the operations of the present invention include digital computers (sometimes referred to herein as nodes, transceivers, etc.), or other similar devices. FIG. 2 is a block diagram illustrating an exemplary computer system 200 upon which an embodiment of the invention may be implemented. The present invention is usable with currently available personal computers, mini-mainframes and the like.

Computer system 200 includes a bus 208 or other communication mechanism for communicating information, and a processor 202 coupled with the bus 208 for processing instructions 224 and information. Computer system 200 also includes a main memory 201, such as a random access memory (RAM) or other dynamic storage device, coupled to the bus 208 for storing information and instructions 224 to be executed by processor 202. Main memory 201 also may be used for storing temporary variables or other intermediate information during execution of instructions to be executed by processor 202. Computer system 200 further includes a read only memory (ROM) 206 or other static storage device coupled to the bus 208 for storing static information and instructions for the processor 202. A storage device 216, such as a magnetic disk or optical disk or other machine readable medium 222, is provided and coupled to the bus 208 for storing information and instructions 224.

Computer system 200 may be coupled via the bus 208 to a display 210 for displaying information to a computer user. Displays such as display 210 may also be used for displaying the machine readable optical labels as described above. An input device 212, including alphanumeric and other keys, is coupled to the bus 208 for communicating information and command selections to the processor 202. Another type of user input device is cursor control 214, such as a mouse, a trackball, or cursor direction keys for communicating direction information and command selections to processor 202 and for controlling cursor movement on the display 210. This input device typically has two degrees of freedom in two axes, a first axis (e.g., x) and a second axis (e.g., y) allowing the device to specify positions in a plane.

According to one embodiment of the invention, the methods described above are performed by instances of a computer system 200 in response to processor 202 executing sequences of instructions contained in main memory 201. Such instructions may be read into main memory 201 from another computer-readable medium, such as storage device 216. Execution of the sequences of instructions contained in the main memory 201 causes the processor 202 to perform the process steps described above.

Computer system 200 also includes a communication interface 220 coupled to the bus 208. Communication interface 220 provides a two-way data communication as is known. For example, communication interface 220 may be an integrated service digital network (ISDN) card or a modem to provide a data communication connection to a corresponding type of telephone line. As another example, communication interface 220 may be a local area network (LAN) card to provide a data communication connection to a compatible LAN. Wireless links may also be implemented. In any such implementation, communication interface 220 sends and receives electrical, electromagnetic or optical signals which carry digital data streams representing various types of information. For example, two or more computer systems 200 may be networked together in a conventional manner with each using the communication interface 220 over a network 226. Computer system 200 also includes an imaging device 218, such as a camera.

Thus, methods and systems for communication with air gapped computer systems, and, more particularly, for such method and systems in which data formatted according to an air-gapped network protocol is converted to machine-readable optical labels for communication across the air gap, have been described.

What is claimed is:

1. A method, comprising:
   at a first computer system of a first computer network, the first computer network comprising a plurality of nodes, each communicatively coupled to only other nodes of the first computer network, receiving SYSLOG data from one or more of the nodes of the first computer network and, line by line, converting the SYSLOG data to one or more machine-readable optical labels, and displaying said machine-readable optical labels on a first display device coupled to the first computer system to provide displayed machine-readable optical labels; and
   at a second computer system communicatively coupled to a second computer network, the second computer network being physically decoupled from the first computer network by an air gap and communicatively coupled to the first computer network through a one-way information flow across the air gap, receiving via an imaging device coupled to the second computer system images of the displayed machine-readable optical labels displayed on the first display device, converting the images of the displayed machine-readable optical labels to reconstituted SYSLOG data, and providing the reconstituted SYSLOG data to one or more nodes of the second computer network.

2. The method of claim 1, wherein the one or more machine-readable optical labels are one or more of: linear or one-dimensional bar codes and matrix or two-dimensional bar codes.

3. A method, comprising:
   at a first computer system of a first computer network, converting a hypertext transfer protocol (HTTP) request issued by an application executing on the first computer system to one or more first machine-readable optical labels and displaying said first machine-readable optical labels on a first display device coupled to the first computer system to provide displayed first machine-readable optical labels;
   at a second computer system of a second computer network comprising a plurality of nodes, each node communicatively coupled to only other nodes of the second computer network,
      receiving via an imaging device coupled to the second computer system images of the displayed first machine-readable optical labels displayed on the first display device,
      decoding the images of the displayed first machine-readable optical labels to recover the request,
      retrieving data responsive to said request from a hypertext markup language (HTML) source stored in a node of the second computer network,
      encoding the data from the HTML source in one or more second machine-readable optical labels, and
      displaying said second machine-readable optical labels on a second display device coupled to the second computer system to provide displayed second machine-readable optical labels; and
   at the first computer system, receiving via an imaging device coupled to the first computer system images of the displayed second machine-readable optical labels displayed on the second display device, decoding the images of the displayed second machine-readable optical labels to recover the data from the HTML source, and providing the recovered data to one or more nodes of the first computer network.

4. The method of claim 3, wherein the one or more first machine-readable optical labels are one or more of: linear or one-dimensional bar codes and matrix or two-dimensional bar codes.

5. The method of claim 3, wherein the one or more second machine-readable optical labels are one or more of: linear or one-dimensional bar codes and matrix or two-dimensional bar codes.

6. The method of claim 3, wherein the one or more first machine-readable optical labels and the one or more second machine-readable optical labels are each one or more of: linear or one-dimensional bar codes and matrix or two-dimensional bar codes.

\* \* \* \* \*